United States Patent [19]

Sasaki et al.

[11] Patent Number: 4,963,618

[45] Date of Patent: Oct. 16, 1990

[54] POLYCARBONATE RESIN COMPOSITION WITH DIENIC IMPACT MODIFIERS

[75] Inventors: Ichiro Sasaki, Suita; Junji Oshima, Toyonaka; Minoru Yamada, Kawanishi, all of Japan

[73] Assignee: Takeda Chemical Industries, Ltd., Osaka, Japan

[21] Appl. No.: 218,297

[22] Filed: Jul. 13, 1988

[30] Foreign Application Priority Data

Jul. 16, 1987 [JP] Japan .................. 62-177968

[51] Int. Cl.$^5$ .............................. C08L 69/00
[52] U.S. Cl. .................................... 525/67
[58] Field of Search ............................ 525/67

[56] References Cited

U.S. PATENT DOCUMENTS 4,180,494 12/1979 Fromuth et al. .............. 525/67
4,539,370 9/1985 Nouvertne .................... 525/67

FOREIGN PATENT DOCUMENTS 0064648 4/1982 European Pat. Off. .
0135779 3/1985 European Pat. Off. .
00185103 6/1986 European Pat. Off. .
0239157 9/1987 European Pat. Off. .
2197930 3/1974 France .

*Primary Examiner*—Patricia Short
*Attorney, Agent, or Firm*—Wenderoth, Lind & Ponack

[57] ABSTRACT

A polycarbonate resin composition which comprises:
  50–80% by weight of a polycarbonate resin,
  20–45% by weight of a poly(1,4-butylene terephthalate) resin and
  5–30% by weight of an impact modifier, based on the resin composition, respectively,
  the impact modifier being a core-shell polymer comprising a core of a polybutadiene in amounts of 40–80% by weight and a shell of a methyl methacrylate polymer which has a glass transition temperature of not less than 60° C. in amounts of 60–20% by weight, based on the core-shell polymer, respectively.

5 Claims, No Drawings

POLYCARBONATE RESIN COMPOSITION WITH DIENIC IMPACT MODIFIERS

This invention relates to a polycarbonate resin composition, and particularly to a polycarbonate resin composition which contains poly(1,4-butylene terephthalate) resins and dienic impact modifiers comprising a multiple stage core-shell polymer with a core of polybutadienes, and has an improved impact resistance at low temperatures and a small dependence of impact resistance on thickness.

Polycarbonate resins possess on the whole excellent heat resistance and mechanical characteristics such as impact strength, and therefore have been widely applied to industrial materials such as electric appliances or machine parts, but also daily necessities. On the other hand, polycarbonate resins, as well known, have a large dependence of impact strength on thickness of molded articles, and in addition, a high melt viscosity so that they are insufficient in moldability. The resins are also insufficient in resistance to organic solvents. These defects of the resins have been hindering application of the results to such as exterior panels of automobiles, or external equipment or appliances such as bumpers or spoilers.

Therefore, there have been proposed a variety of polycarbonate blends to improve the thickness dependence of impact strength and fluidity in molding. Such blends include dienic polymers such as acrylonitrile-styrene-butadiene copolymers (ABS resins), methyl methacrylate-styrene-butadiene copolymers (MBS resins) or styrene-butadiene block copolymers (SBS resins), olefinic resins such as polyethylenes or hydrogenated styrene-butadiene block copolymers (SEBS resins), or acrylic resins such as acrylonitrile-styrene-acrylic acid esters copolymers (AAS resins).

As set forth, the blending of polycarbonate resins with, for example, ABS resins, certainly improves the thickness dependence of impact strength and fluidity in molding, however, the blending is attended by the decrease in heat resistance, and further by the decrease in mechanical properties such as tensile strength or flexural modulus.

It is also known that the blending of polycarbonate resins with polybutylene terephthalate resins improves the resistance to organic solvents and fluidity in molding, as is disclosed in Japanese Patent Publication No. 53-12537, but the polymer blends have a much lower impact strength than the polycarbonate resins.

A further polymer blend has been proposed in, for example, U.S. Pat. No. 3,846,428, which is a polymer blend of polycarbonate resins, polybutylene terephthalate resins and graft copolymers of polybutadienes with styrene and acrylonitrile. However, this polymer blend still remains insufficient in impact strength at low temperatures.

A still further polymer blend has been proposed in Japanese Patent Laid-Open No. 58-103551 (filed based on U.S. patent application Ser. No. 316,946). The blend comprises polybutylene terephthalate resins, a relatively small amount of polycarbonate resins and so-called core-shell polymers with a rubbery core composed either of conjugated diene homopolymers or graft copolymers of conjugated dienes/vinyl monomers. This polymer blend is said to have an improved impact strength at low temperatures, but it still has a significant thickness dependence of impact resistance.

The present inventors have made intensive investigations to improve the aforesaid insufficient impact strength at low temperatures and significant temperature dependence of impact strength on thickness especially at low temperatures, and have found that the blending of polycarbonate resins with poly(1,4-butylene terephthalate) resins together with core-shell polymers with a core comprising polybutadienes and a shell comprising specific methyl methylacrylate (co)polymers greatly improves impact strength at low temperatures and remarkably decreases the thickness dependence of impact strength without deterioration of the other desired properties as very often inescapable.

It is therefore an object of the invention to provide a polycarbonate resin composition which has an improved impact strength at low temperatures and a small thickness dependence of impact strength in particular at low temperatures.

According to the invention, there is provided a polycarbonate resin composition which comprises:
  50–80% by weight of a polycarbonate resin,
  20–45% by weight of a poly(1,4-butylene terephthalate) resin and
  5–30% by weight of an impact modifier, based on the resin composition, respectively,
  the impact modifier being a core-shell polymer comprising a core of a polybutadiene in amounts of 40–80% by weight and a shell of a homopolymer or a copolymer of methyl methacrylate which has a glass transition temperature of not less than 60° C. in amounts of 60–20% by weight, based on the core-shell polymer, respectively.

The polycarbonate resins per se are already well known in the art, and bis(hydroxyaromatic)alkane polycarbonate resins are preferred in the invention. Such polycarbonate resins are produced by the reaction of a bis(hydroxyaromatic)alkane, for example, bis(4-hydroxyphenyl)methane, bis(4-hydroxyphenyl)ethane, 2,2'-bis(4-hydroxyphenyl)propane or 2,2'-bis(4-hydroxy-3,5-dichlorophenyl)propane, with phosgene or diphenyl carbonate. When a polycarbonate resin prepared by the reaction of 2,2'-bis(4-hydroxyphenyl)propane with phosgene is used, the resin has preferably a viscosity average molecular weight of from $2.2 \times 10^4$ to $3.1 \times 10^4$. These polycarbonate resins are available from a number of sources. The polycarbonate resin is used singly or as a mixture of two or more.

The poly(1,4-butylene terephthalate) resin is also available commercially or can be produced by known methods as by heating together terephthalic acid or dimethyl terephthalate and an excess of tetramethylene glycol at elevated temperatures and thereafter heating the reaction mixture in the absence of air and presence of nitrogen or other inert gases for some hours until a desired intrinsic viscosity is reached, as described in U.S. Pat. Nos. 2,465,319 and 3,047,539, for example.

The impact modifier used in the invention is a core-shell polymer comprising 40–80% by weight of a core and 60–20% bhy weight of a shell, based on the core-shell polymer, respectively. The core is composed of polybutadienes rubbery at room temperatures, while the shell is a glassy homopolymer or a copolymer of methyl methacrylate with a comonomer copolymerizable therewith which has a glass transition temperature of not less than 60° C., preferably not less than 80° C.

When the core-shell polymer has a core in amounts of less than 40% by weight based on the core-shell polymer, the resultant polycarbonate resin composition is not improved in the thickness dependence of impact strength at low temperatures, whereas when the core-shell polymer has a core in amounts of more than 80% by weight based on the core-shell polymer, the resultant polycarbonate resin composition is insufficient in moldability and is attended by problems in processing. Meanwhile, when the shell has a glass transition temperature of less than 60° C., the resultant polycarbonate resin composition is of sufficient heat resistance. A core-shell polymer composed of 50-70% by weight of a core and 50-30% by weight of a shell, each based on th core-shell polymer, is especially preferred in the invention.

The core-shell polymer is often called a multiple stage polymer in literature, and has a first stage polymer called the core and the final stage polymer called the shell. The core-shell polymer may be prepared sequentially by emulsion polymerization wherein each successive outer stage coats the previous stage polymer, as is described in, for example, U.S. Pat. No. 4,034,013. By way of example, a butadiene latex is first prepared by emulsion polymerization, and then in the presence of the latex particles as cores, methyl methacrylate and optionally a cross-linkable monomer such as ethylene glycol dimethacrylate are subjected to emulsion polymerization to cover the core, thus forming a shell. The core-shell polymer is also commercially available, if desired.

In the preparation of the shell, there may be used as a second comonomer copolymerizable with methyl methacrylate, for example, aromatic monovinyl monomers such as styrene or α-methylstyrene, monovinyl cyanide monomers such as acrylonitrile or methacrylonitrile, acrylate monomers such as methyl acrylate, ethyl acrylate, hydroxyethyl acryalte or glycidyl acrylate, or methacrylate monomers such as butyl methacrylate, hydroxyethyl methacrylate or glycidyl methacrylate.

The shell may be a cross-linked homopolymer or copolymer of methyl methacrylate with a cross linkable monomer. The cross linkable monomer usable includes, for example, aromatic divinyl monomers such as divinylbenzene, alkanepolyol polyacrylates or polymethacrylates such as ethylene glycol diacrylate, ethylene glycol dimethyacrylate, butylene glycol diacrylate, butylene glycol dimethacrylate, oligoethylene glycol diacrylate, oligoethylene glycol dimethacrylate, trimethylolpropane diacrylate, treimethylolpropane dimethacrylate, trimethylolpropane triacrylate or trimethylolpropane trimethacrylate, and unsaturated carboxylic acid allyl esters such as allyl acrylate, allyl methacrylate or diallyl maleate. The cross linkable monomer may be used in amounts of about 0.01-5% by weight, preferably of about 0.1-2% by weight based on the monomers used.

The core-shell polymer used in the invention is usually a two stage polymer composed of a core as the first stage polymer and a shell as the final stage polymer, however, the core-shell polymer may contain middle stage polymers between the core and the shell. The middle stage polymers may be composed of homopolymers or copolymers of alkyl acrylates or methacrylates wherein the alkyl has preferably 1-4 carbons, e.g., methyl acrylate or ethyl acrylate, aromatic vinyl monomers such as styrene or α-methylstyrene, vinyl cyanide monomers such as acrylonitrile or methacrylonitrile. When the core-shell polymer contains the middle stage polymer, the amount thereof is preferably of not more than about 30% by weight based on the core-shell polymer.

A core-shell polymer composed of a core of polyacrylic acid esters is known, however, the incorporation thereof into a polycarbonate resin together with the poly(1,4-butylene terephthalate) provides a resin composition which is in general of insufficient impact strength at low temperatures, and if the composition is improved in impact strength at low temperatures at all, the composition is not free from thickness dependence of impact strength at low temperatures.

The polycarbonate resin composition of the invention comprises: 50-80% by weight of a polycarbonate resin, 20-45 % by weight of a poly(1,4-butylene terephthalate) resin and 5-30% by weight of an impact modifier, based on the resin composition, respectively, the three components being in total 100% by weight. More preferably, the polycarbonate resin composition of the invention comprises: 60-70% by weight of a polycarbonate resin, 20-35% by weight of a poly(1,4-butylene terephthalate) resin and 5-20% by weight of an impact modifier, based on the resin composition, respectively.

When the ratio of the amounts of the polycarbonate resins and the poly(1,4-butylene terephthalate) resin is outside the above specified, the resultant resin composition is not improved in the thickness dependence of impact strength at low temperatures. On the other hand, when the amounts of the impact modifier is less than 5% by weight based on the resin composition, the resultant resin composition has an insufficient impact strength, whereas when the amount of the impact modifier is more than 30% by weight based on the resin composition, the resultant resin composition is of insufficient heat resistance, tensile yield strength and flexural modulus.

The polycarbonate resin composition of the invention may be prepared by blending a polycarbonate resin with a poly(1,4-butylene terephthalate) resin and an impact modifier in the amounts above specified. The method and means for the blending are not specifically limited, however, a melt-blending is preferred wherein the components are blended usually at temperatures of about 200°-260° C. with lower temperatures preferred by means of heated rolls, Banbury mixers or, single or twin screw extruders. When extruders are used, it is preferred that the components are pulverized and dried preliminarily, and then pelletized. The pellets are dried sufficiently, and then injection-molded. However, the resin composition is not limited specifically in form, and may be in the form of pellets or powders, for example.

Additives may be contained in the resin compositions in suitable amounts. The additives include, for example, fire retardants, mold releasing agents, weather resistant agents, antioxidants, antistatic agents, heat resistant agents, pigments, reinforcements, surfactants, fillers and lubricants. Polyolefins may be further contained in the resin composition to impart excellent dispersibility to the composition.

The polycarbonate resin composition of the invention may be molded by known conventional methods such as injection molding or compression molding usually at temperatures of about 230°-300° C.

The polycarbonate resin composition of the invention is excellent in impact strength at low temperatures, and moreover the impact strength is substantially freed from thickness dependence. The molded articles thereof have high tensile strength and flexural modulus requisite to engineering plastics.

The invention will now be described with reference to examples, which however are not to be construed as limiting to the invention. In the examples, parts are parts by weight unless otherwise designated.

The measurements of the properties of specimens carried out as follows:

Tensile yield strength was determined using a No. 1 dumbbell specimen at a tensile speed of 50 mm/minute according to JIS K 7113.

Flexural modulus was determined using a specimen of 110 mm in length, 6.4 mm in thickness and 12.8 mm in width with a support distance of 88 mm at a bending speed of 2 mm/minute according to JIS K 7203.

Izod impact strength was determined at 23° C. and −30° C., respectively, using a specimen of 3.2 mm and 6.4 mm in thickness, respectively, according to JIS K 7110.

Heat distortion temperature was determined under a load of 18.6 kgf/cm$^2$ according to JIS K 7110.

EXAMPLES 1-7

A polycarbonate resin prepared by the reaction of 2,2'-bis(4-hydroxyphenyl)propane with phosgene and having a viscosity average molecular weight of about 2.8×10$^4$ (Yupilon S-1000, Mitsubishi Gas Kagaku Kogyo K. K., Japan), a poly(1,4-buytlene terephthalate) resin of high viscosity grade (PBT 1401×04, Toray K. K., Japan) and an impact modifier, either of A to E as described below were admixed together in amounts as shown in Table 1. The mixture was melt-blended by means of a single screw extruder provided with a cylinder of 30 mm in diameter at a temperature of 235° C. to provide a polycarbonate resin composition in the form of pellets.

The pellets were dried at 120° C. for 4 hours by use of an air drier, and then injection-molded at a molding cylinder temperature of 260° C. and a nozzle temperature of 270° C., to provide specimens. The properties of the specimens are shown in Table 1.

The composition of the impact modifiers used herein were as follows in terms of monomer weight ratios:

Impact modifier A: the core of 70 parts of butadiene, and the shell of 30 parts of methyl methacrylate/styrene in a weight ratio of 18/12, having a glass transition temperature of 94° C.

Impact modifier B: the core of 70 parts of butadiene, and the shell of 30 parts of methyl methacrylate/styrene/1,4-butylene glycol diacrylate in a weight ratio of 17.8/11.9/0.3 having a glass transition temperature of 95° C.

Impact modifier C: the core of 50 parts of butadiene, and the shell of 50 parts of methyl methacrylate/styrene/1,4-butylene glycol diacrylate in a weight ratio of 29.7/19.8/0.5 having a glass transition temperature of 97° C.

Impact modifier D: the core of 70 parts of butadiene, the middle stage polymer of 10 parts of styrene/acrylonitrile in a weight ratio of 7/3, and the shell of 20 parts of methyl methacrylate/ethyl acrylate/1,4-butylene glycol diacrylate in a weight ratio of 17.8/2.0/0.2 having a glass transition temperature of 95° C.

Impact modifier E: the core of 70 parts of butadiene, and the shell of 30 parts of methyl methacrylate/1,4-butylene glycol diacrylate in a weight ratio of 29.7/0.3 having a glass transition temperature of 102° C.

Impact modifier F: the core of 70 parts of butyl acrylate/ethylene glycol dimethacrylate/allyl methacrylate in a weight ratio of 68.5/0.5/1.0, and the shell of 30 parts of methyl methacrylate/ethyl acrylate/ethylene glycol dimethacrylate in a weight ratio of 26/3/1 having a glass transition temperature of 102° C.

Impact modifier G: the core of 30 parts of butadiene, and the shell of 70 parts of acrylonitrile/styrene in a weight ratio of 20/50 having a glass transition temperature of 108° C.

Impact modifier H: the core of 50 parts of butadiene, and the shell of 50 parts of methyl methacrylate/ethyl acrylate/1,4-butylene glycol diacrylate in a weight ratio of 24.8/24.7/0.5 having a glass transition temperature of 58° C.

Comparative Examples 1-6

The same polycarbonate resin and poly(1,4-butylene terephthalate) resin as before and an impact modifier, B, F, G or H as described before were mixed together in amounts as shown in Table 2, and then pelletized in the same manner as in the previous examples.

The pellets were dried at 120° C. for 4 hours by use of an air drier, and then injection-molded to provide specimens. In Comparative Examples 5 and 6, the molding conditions were the same as in Example 1, but in Comparative Examples 1 to 4, the molding cylinder temperature was 210° C. and the nozzle temperature was 250° C. The properties of the specimens are shown in Table 2.

TABLE 1

| | Examples | | | | | | |
|---|---|---|---|---|---|---|---|
| | 1 | 2 | 3 | 4 | 5 | 6 | 7 |
| Resin Composition* | | | | | | | |
| Polycarbonate | 60 | 60 | 60 | 70 | 60 | 60 | 60 |
| Poly(1,4-butylene terephthalate) | 25 | 35 | 25 | 20 | 25 | 25 | 25 |
| Impact modifier | | | | | | | |
| A | 15 | — | — | — | — | — | — |
| B | — | 5 | 15 | 10 | — | — | — |
| C | — | — | — | — | 15 | — | — |
| D | — | — | — | — | — | 15 | — |
| E | — | — | — | — | — | — | 15 |
| F | — | — | — | — | — | — | — |
| G | — | — | — | — | — | — | — |
| H | — | — | — | — | — | — | — |
| Properties of Resin Composition | | | | | | | |
| Tensile yield strength (kgf/cm$^2$) | 510 | 590 | 500 | 550 | 540 | 490 | 490 |
| Flexural modulus (kgf/cm$^2$) | 19000 | 21800 | 18800 | 20400 | 20500 | 18200 | 19100 |
| Izod impact strength (kgf · cm/cm) | | | | | | | |
| 23° C., 3.2 mm thick | 68 | 118 | 79 | 97 | 84 | 69 | 71 |
| 6.4 mm thick | 66 | 35 | 74 | 58 | 74 | 63 | 69 |
| −30° C., 3.2 mm thick | 62 | 38 | 64 | 41 | 64 | 58 | 59 |
| 6.4 mm thick | 50 | 30 | 53 | 35 | 40 | 45 | 47 |

TABLE 1-continued

|  | Examples | | | | | | |
| --- | --- | --- | --- | --- | --- | --- | --- |
|  | 1 | 2 | 3 | 4 | 5 | 6 | 7 |
| Heat distortion temperature (°C.) | 88 | 86 | 89 | 99 | 92 | 100 | 94 |

Notes: *Parts by weight

TABLE 2

|  | Comparative Examples | | | | | |
| --- | --- | --- | --- | --- | --- | --- |
|  | 1 | 2 | 3 | 4 | 5 | 6 |
| Resin Composition* | | | | | | |
| Polycarbonate | 15 | 15 | 30 | 35 | 60 | 60 |
| Poly(1,4-butylene terephthalate) | 70 | 70 | 60 | 50 | 25 | 25 |
| Impact modifier | | | | | | |
| A | — | — | — | — | — | — |
| B | 15 | — | 10 | 15 | — | — |
| C | — | — | — | — | — | — |
| D | — | — | — | — | — | — |
| E | — | — | — | — | — | — |
| F | — | 15 | — | — | — | — |
| G | — | — | — | — | 15 | — |
| H | — | — | — | — | — | 15 |
| Properties of Resin Composition | | | | | | |
| Tensile yield strength (kgf/cm$^2$) | 470 | 470 | 500 | 490 | 570 | 500 |
| Flexural modulus (kgf/cm$^2$) | 20600 | 20600 | 21000 | 20300 | 21800 | 18500 |
| Izod impact strength (kgf · cm/cm) | | | | | | |
| 23° C., 3.2 mm thick | 98 | 100 | 90 | 85 | 80 | 65 |
| 6.4 mm thick | 85 | 78 | 72 | 68 | 63 | 57 |
| −30° C., 3.2 mm thick | 35 | 6 | 33 | 38 | 61 | 48 |
| 6.4 mm thick | 3 | 4 | 3 | 4 | 11 | 40 |
| Heat distortion temperature (°C.) | 63 | 65 | 73 | 76 | 104 | 78 |

Notes: *Parts by weight

What is claimed is:

1. A polycarbonate resin composition which comprises:
   50–80% by weight of a polycarbonate resin,
   20–45% by weight of a poly(1,4-butylene terephthalate) resin and
   5–30% by weight of an impact modifier, based on the resin composition, respectively,
   the impact modifier being a core-shell polymer comprising a core consisting essentially of a polycarbonate in amounts of 40–80% by weight and a shell of a homopolymer of a copolymer of methyl methacrylate which has a glass transition temperature of not less than 60° C. in amounts of 60–20% by weight, based on the core-shell polymer, respectively.

2. The polycarbonate resin compositions as claimed in claim 1, wherein the shell is composed of a copolymer of methyl methacrylate with at least one of aromatic monovinyl monomers, monovinyl cyanide monomers, acrylate monomers and methacrylate monomers other than methyl methacrylate.

3. The polycarbonate resin composition as claimed in claim 1, wherein the shell is a cross-linked homopolymer or copolymer of methyl methacrylate.

4. The polycarbonate resin composition as claimed in claim 3, wherein the copolymer is a copolymer of methyl methacrylate with at least one of aromatic monovinyl monomers, monovinyl cyanide monomers, acrylate monomers and methacrylate monomers other than methyl methacrylate.

5. The polycarbonate resin composition as claimed in claim 3, wherein the shell is a cross-linked homopolymer or copolymer prepared with a cross linkable monomer in amounts of about 0.01–5% by weight based on the monomers used.

* * * * *

UNITED STATES PATENT AND TRADEMARK OFFICE
CERTIFICATE OF CORRECTION

PATENT NO. : 4,963,618
DATED : October 16, 1990
INVENTOR(S) : ICHIRO SASAKI, JUNJI OSHIMA and MINORU YAMADA It is certified that error appears in the above-indentified patent and that said Letters Patent is hereby corrected as shown below:

Col. 7, claim 1, lines 40-41, change "polycarbonate" to --polybutadiene-- line 42, change "of" (second occurrence) to --or--.

Col. 5, line 4, before "carried" insert --were--.

Signed and Sealed this

Third Day of May, 1994

Attest:

BRUCE LEHMAN

Attesting Officer

Commissioner of Patents and Trademarks